United States Patent [19]
Ohrnell

[11] 3,850,280
[45] Nov. 26, 1974

[54] SUSPENSION YOKE FOR THE CONVEYANCE OF GOODS

[76] Inventor: Olof Ohrnell, Torgilsgatan 17 B, 502 41 Boras, Sweden

[22] Filed: Mar. 13, 1973

[21] Appl. No.: 340,894

[52] U.S. Cl............... 198/1, 104/166, 105/150, 198/177 R, 198/213
[51] Int. Cl............................................ B61b 3/00
[58] Field of Search........ 198/177, 1, 213; 104/166; 105/150

[56] References Cited
UNITED STATES PATENTS
| | | | |
|---|---|---|---|
| 2,229,002 | 1/1941 | Cowey | 198/177 R X |
| 2,404,885 | 7/1946 | Pile | 198/177 R |
| 2,908,379 | 10/1959 | Hamilton | 198/177 R X |

FOREIGN PATENTS OR APPLICATIONS
| | | | |
|---|---|---|---|
| 1,278,396 | 1/1961 | France | 104/118 |
| 1,033,823 | 6/1966 | Great Britain | 104/166 |

*Primary Examiner*—Richard A. Schacher
*Assistant Examiner*—Jeffrey V. Nase
*Attorney, Agent, or Firm*—Wenderoth, Lind & Ponack

[57] ABSTRACT

A suspension yoke for the conveyance of goods along various conveying devices has wheels set at such an angle that when the wheels engage a rotating tube or like means the suspension yoke is advanced along the tube by the rotary movement imparted to the wheels by the rotation of the tube, hook means so arranged that when the hook means engages the screw thread of a rotating conveyor screw the suspension yoke is advanced along the screw by the rotation thereof, and a roller so mounted that when the roller engages a downwardly inclining rod or like element the suspension yoke is advanced along the rod by gravity.

1 Claim, 3 Drawing Figures

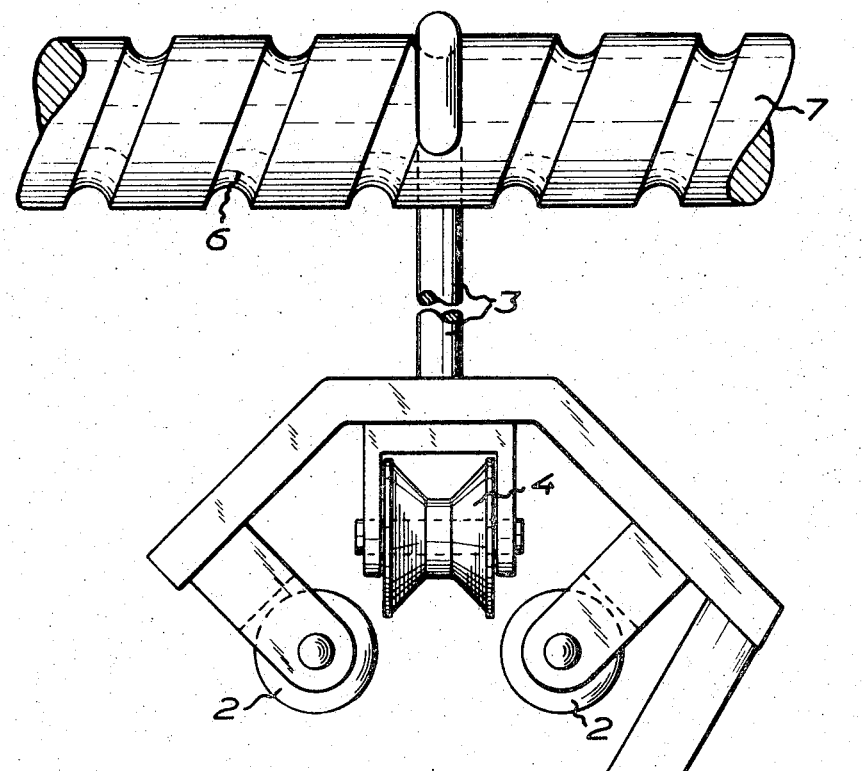
FIG. I

SUSPENSION YOKE FOR THE CONVEYANCE OF GOODS

BACKGROUND AND SUMMARY OF THE INVENTION

This invention relates to a suspension yoke for the conveyance of goods along various conveying devices. According to the invention, the suspension yoke has wheels set at such an angle that when the wheels engage a rotating tube or like means the suspension yoke is advanced along the tube by the rotary movement imparted to the wheels by the rotation of the tube, hook means so arranged that when the hook means engages the screw thread of a rotating conveyor screw the suspension yoke is advanced along the screw by the rotation thereof, and a roller so mounted that when the roller engages a downwardly inclining rod or like element the suspension yoke is advanced along the rod by gravity.

The present invention provides a suspension yoke which is useful in the most varying combinations of conveying devices. The suspension yoke can thus be designated as a universal yoke means.

BRIEF DESCRIPTION OF THE DRAWINGS

The invention will be more fully described hereinbelow with reference to the accompanying drawings wherein:

FIG. 1 is a side view of the suspension yoke of the invention cooperating with a screw conveyor;

DETAILED DESCRIPTION OF THE INVENTION

Figure 3:
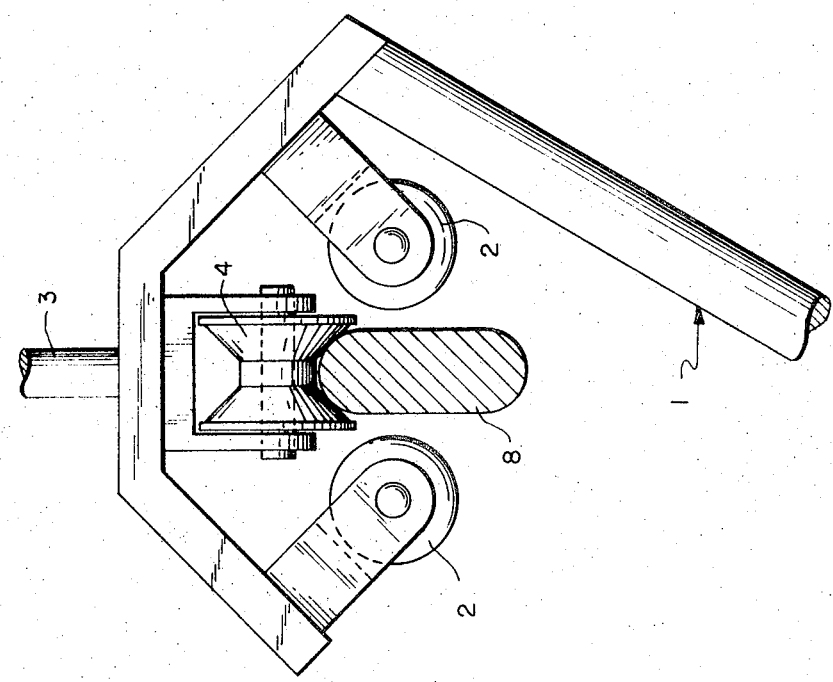
FIG. 3 is a view similar to FIG. 2, but illustrating the suspension yoke cooperating with an inclined rod conveyor.

The suspension yoke 1 proper is intended to carry the goods to be conveyed. According to the invention, the yoke means 1 includes a yoke frame 10 and has three different elements for the conveyance of the goods, viz. the wheels 2, hook means 3 and roller 4.

Figure 2:
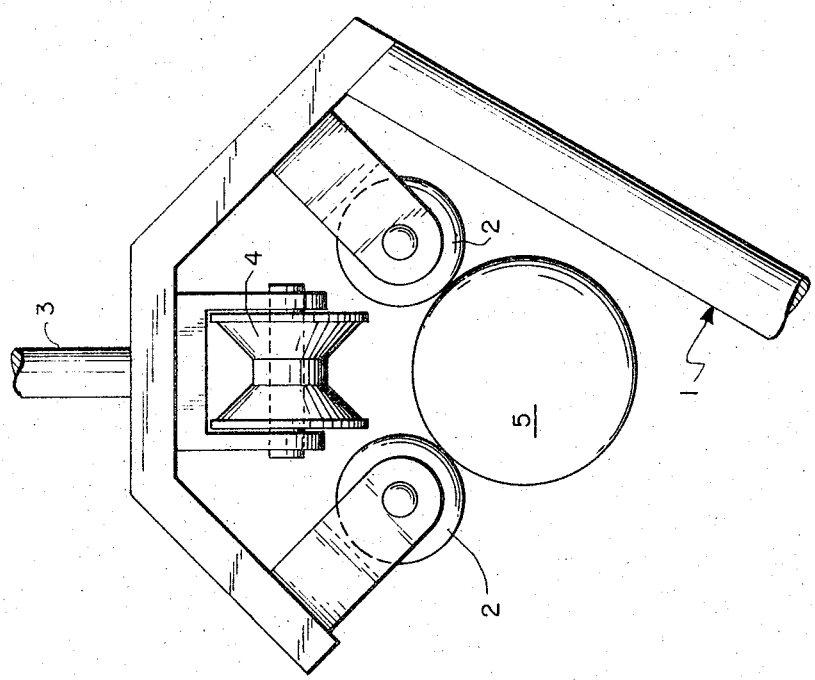
FIG. 2 is a view similar to FIG. 1, but with the portions broken away, illustrating the suspension yoke cooperating with a rotating tube conveyor.

The wheels 2, preferably a single wheel pair, are set at such an angle that when the wheels 2 engage a rotating tube 5 or like element the yoke 1 is advanced along the tube 5 by the rotary movement imparted to the wheels 2 by the rotation of the tube 5, as shown in FIG. 2.

The hook means 3 is arranged, as shown in FIG. 1, in such a way as to engage the screw thread 6 of a rotating conveyor screw 7. By such engagement the suspension yoke 1 is advanced along the conveyor screw 7 by reason of the rotation thereof. The hook means 3 may also be intended for use when the suspension yoke means 1 is to be withdrawn from a conveyor. A withdrawing device can thus be caused to engage the hook means 3 for lifting off the suspension yoke 1 from the conveyor.

The roller 4 is mounted in such a way as to engage a downwardly inclining rod 8 or like element, as shown in FIG. 3. By such engagement the suspension yoke 1 is advanced along the rod 8 by gravity. The roller 4 can be utilized for transferring the suspension yoke 1 from one conveyor to another. It can also be used when the suspension yoke 1 is transferred from a conveyor to a stock for the goods depending from the yoke 1.

The suspension yoke 1 should be assembled from standard components. In that case parts that are not absolutely necessary can be omitted in simple conveying devices. The roller 4 might thus be omitted in certain cases, and the suspension yoke 1 would then be provided only with the wheels 2 and the hook means 3.

The suspension yoke according to the invention is particularly intended for use in a conveyor of the type used in the continuous manufacture of industrial products which are treated and/or assembled stepwise in a number of working stations along said conveyor. The positions of stops 9 determine in which working station the suspension yoke 1 should be removed from the conveyor.

The invention is not limited to the embodiment described above and illustrated in the drawing but permits of modification within the scope of the appended claim.

What I claim and desire to secure by Letters Patent is:

1. A universal suspension yoke for use in a conveyor system including separate and independent rotating tube conveyors, screw conveyors, and inclined rod conveyors, said suspension yoke comprising:
   a yoke frame;
   wheel means rotatably mounted at an angle on said yoke frame for selective independent engagement with a rotating tube conveyor of said conveyor system and for imparting movement to said suspension yoke along said rotating tube conveyor;
   hook means mounted on said yoke frame for selective independent engagement with a screw conveyor of said conveyor system and for imparting movement to said suspension yoke along said screw conveyor;
   roller means rotatably mounted on said yoke frame for selective independent engagement with an inclined rod conveyor of said conveyor system and for allowing downward movement of said suspension yoke due to the effect of gravity thereon along said inclined rod conveyor; and
   said wheel means, said hook means, and said roller means being mounted on said yoke frame for separate and nonsimultaneous movement along said rotating tube conveyor, said screw conveyor, and said inclined rod conveyor, respectively.

* * * * *